(12) United States Patent
Masse et al.

(10) Patent No.: US 6,549,757 B1
(45) Date of Patent: Apr. 15, 2003

(54) METHOD AND SYSTEM FOR ASSESSING, AT RECEPTION LEVEL, THE QUALITY OF A DIGITAL SIGNAL, SUCH AS A DIGITAL AUDIO/VIDEO SIGNAL

(75) Inventors: Denis Masse, Rosselange (FR); Jamal Baina, Nancy (FR)

(73) Assignee: Telediffusion de France, Paris (FR)

( * ) Notice: Subject to any disclaimer, the term of this patent is extended or adjusted under 35 U.S.C. 154(b) by 0 days.

(21) Appl. No.: 09/529,308

(22) PCT Filed: Oct. 12, 1998

(86) PCT No.: PCT/FR98/02179

§ 371 (c)(1),
(2), (4) Date: Apr. 12, 2000

(87) PCT Pub. No.: WO99/20017

PCT Pub. Date: Apr. 22, 1999

(30) Foreign Application Priority Data

Oct. 13, 1997 (FR) .............................................. 97 12763

(51) Int. Cl.[7] .......................... H04B 17/00; H04Q 1/20; H04K 1/00; H04J 1/16
(52) U.S. Cl. .................... 455/67.3; 455/67.1; 455/3.01; 455/69; 455/68; 455/70; 455/71; 375/224; 375/225; 375/358; 375/209; 370/335; 370/241; 370/13; 370/487; 371/22; 371/28
(58) Field of Search ............................... 455/67.3, 67.1, 455/3.01, 502, 69, 68, 71, 70; 375/209, 224, 225, 228, 358; 370/335, 241, 13, 487; 371/22, 28; 714/735, 736, 704

(56) References Cited

U.S. PATENT DOCUMENTS

| | | | | |
|---|---|---|---|---|
| 3,892,955 A | * | 7/1975 | Maejima ...................... 714/736 |
| 3,988,670 A | * | 10/1976 | Gariazzo ..................... 714/735 |
| 4,300,233 A | * | 11/1981 | Gibbs ........................... 714/704 |
| 5,790,523 A | * | 8/1998 | Ritchie et al. ................ 370/241 |
| 5,799,010 A | * | 8/1998 | Lomp et al. ................. 370/335 |
| 5,859,874 A | * | 1/1999 | Wiedeman et al. ......... 370/320 |
| 5,903,598 A | * | 5/1999 | Hunsinger et al. .......... 375/150 |
| 6,246,698 B1 | * | 6/2001 | Kumar ........................ 370/487 |

* cited by examiner

Primary Examiner—Vivian Chin
Assistant Examiner—Kamran Afshar
(74) Attorney, Agent, or Firm—Larson & Taylor, PLC

(57) ABSTRACT

The invention concerns a method and a system for assessing the quality of a broadcast digital signal.

A reference signal (sref) is generated (1001) from an initial signal (so) and jointly broadcast (1002) with a digital signal (sn). At reception level, the broadcast digital signal and reference signal received (snr, sref) are synchronized (2001) and a value D of the distance between the reference signal and the digital signal (snr, sref) is computed (2002) for assigning (2003) a quality value Q. The invention is applicable to the broadcast of audio and/or video digital signals.

16 Claims, 6 Drawing Sheets

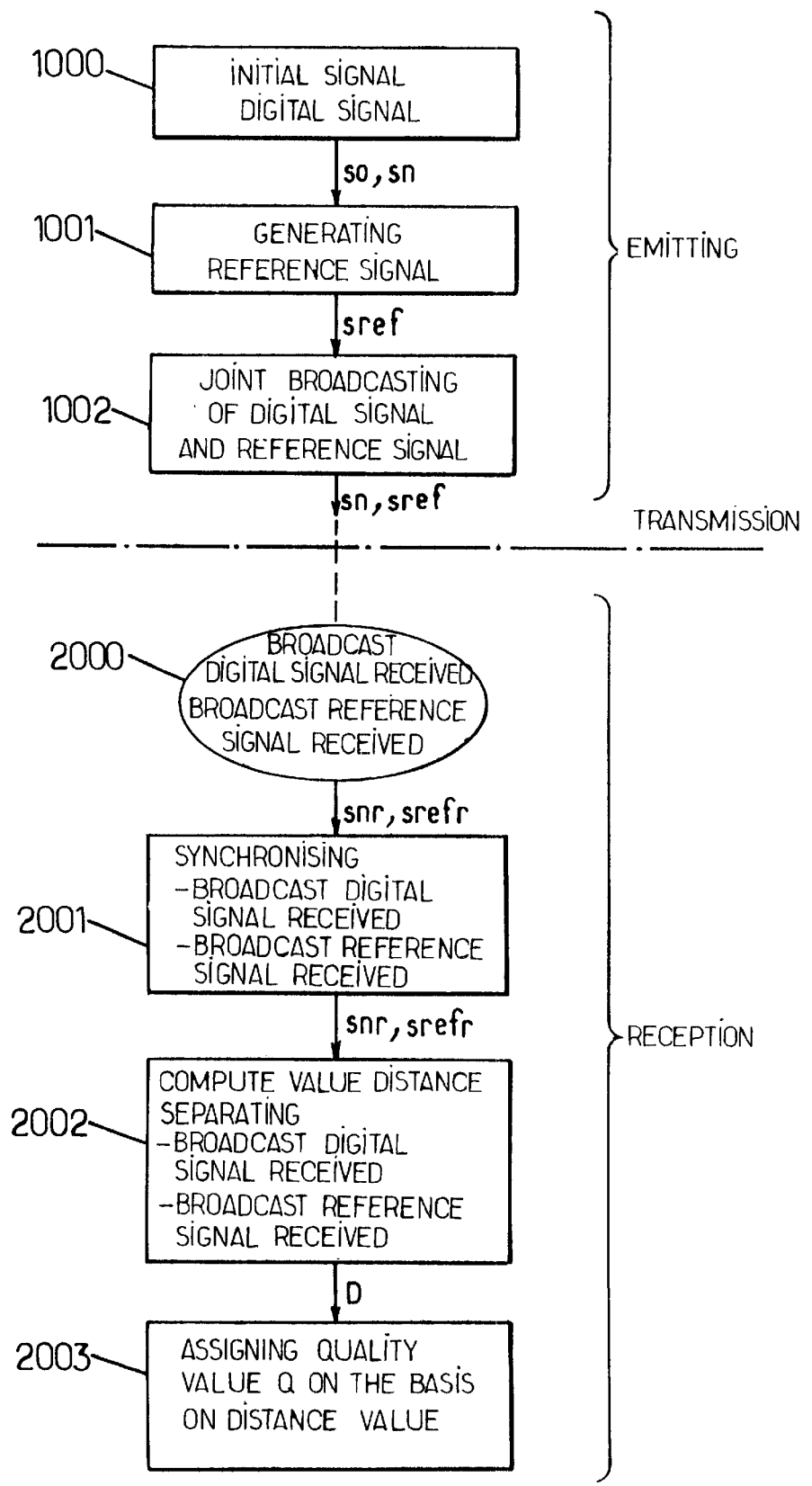

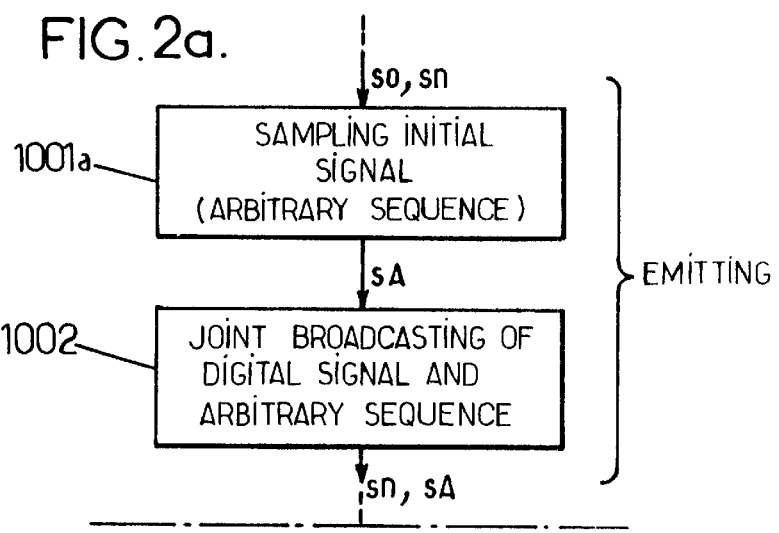
FIG. 2a.
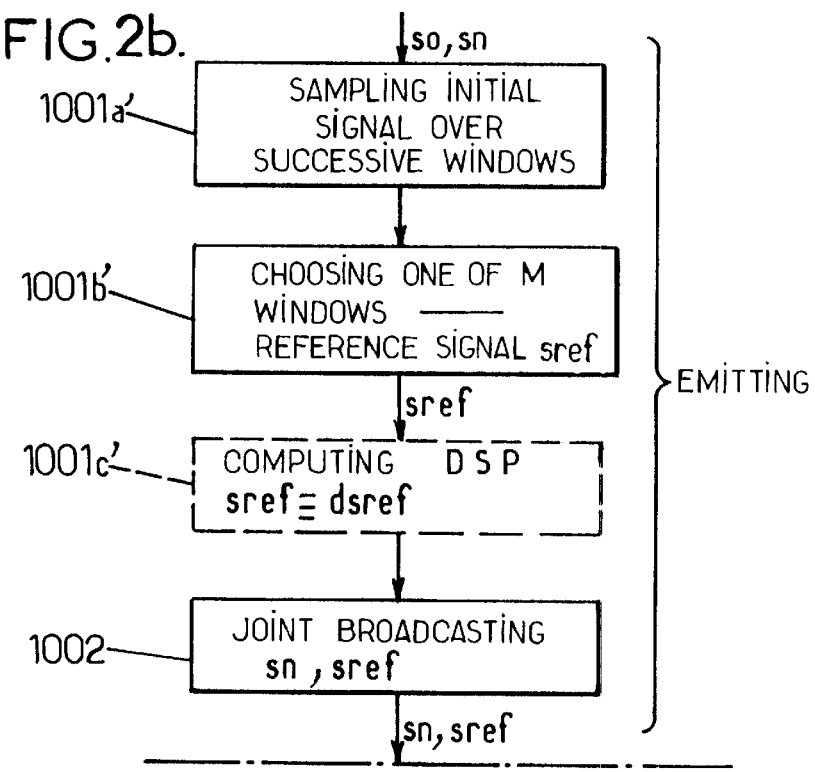
FIG. 2b.
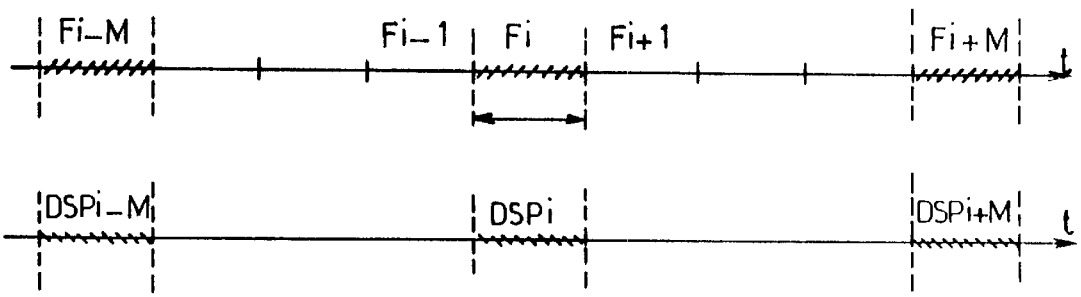

$$D = \frac{1}{N} \sum_{i=0}^{N-1} d_i$$

REFERENCE SIGNAL GENERATOR
(EMISSION)

REFERENCE SIGNAL GENERATOR
(EMISSION)

QUALITY EVALUATION MODULE
(RECEPTION)

METHOD AND SYSTEM FOR ASSESSING, AT RECEPTION LEVEL, THE QUALITY OF A DIGITAL SIGNAL, SUCH AS A DIGITAL AUDIO/VIDEO SIGNAL

Transmitting data of all types is a key feature of economic and cultural life today.

The objective of transmission techniques, which are tending more and more towards digital signal transmission, is to reduce transmission speeds by coding and compression and then decoding and decompression to avoid overloading the transmission networks and optimise their use as a result, whilst preserving high transmission quality.

More specifically in the field of digital signal transmission, for example digital audio/video signals, the quality of the transmitted signal is essentially a concept based on subjective analysis. Accordingly, in the case of a digital audio signal or a digital audio/video signal, the subjective quality of this decoded-coded sound signal is a quality that is evaluated on the basis of subjective tests. These subjective tests essentially consist in assigning a value score to the decoded-coded signal by asking a group of listeners to assess the quality.

Various psycho-acoustic models have been developed as part of the techniques used to implement digital compression on digital audio signals. These models have also enabled objective perceptual measuring methods to be applied as a means of evaluating the subjective quality of coded digital audio signals.

All of these objective perceptual measuring methods operate on a same principle, which consists in comparing the decoded-coded sound signal with the original signal. The original signal is the digital audio signal prior to coding and compression, also referred to as the reference signal. In order to apply the above-mentioned methods, it is therefore necessary to have a reference signal, which must be as finely synchronised with the digital audio signal to be tested as possible. Constraints of this type can be readily dealt with by simulation, for example, so that a coding process can be evaluated logically, or when a digital audio signal or a digital audio/video signal is emitted and broadcast, at the stage when this latter is emitted in order to evaluate the objective quality of the coded signal transmitted. In this latter instance, the original signal is necessarily available and it is possible to determine the delay caused by the process used to generate the coded signal, which can be applied as a means of re-synchronising this coded signal, which will be the signal tested, and the reference signal. However, this is not always the case when the digital audio signal or digital audio/video signal is received during the transmission. To date, the only way of assessing the quality of a broadcast signal in the case of a digital audio signal is to listen to it in order to judge the subjective quality.

The objective of this invention is to remedy the above-mentioned drawback so that a process can be applied to a broadcast digital signal immediately on reception in order to evaluate the transmission quality and, more specifically in the case of a digital audio signal or a digital audio/video signal, take perceptual measurements.

This objective is achieved by applying a method of evaluating the quality of a digital signal broadcast as a transmission from an initial signal, this method consisting in generating a reference signal representative of this initial signal and broadcasting the digital signal and the reference signal jointly. At the reception stage, this method consists in synchronising the broadcast digital signal received and the broadcast reference signal received and computing a distance value, denoting the variance from identity, separating the broadcast digital signal received from the broadcast reference signal received. This distance value can be used as a criterion for assigning a quality value to the digital signal on reception.

The present invention can be applied in the field of digital signal transmission by Hertzian or satellite channel, particularly in the case of audio signals and/or audio/video signals such as television or radio signals.

A more detailed description of the method and system for evaluating the quality of the digital signal on reception, proposed by the invention, will be given below with reference to the appended drawings, of which:

FIG. 1 is a synoptic diagram illustrating how the method proposed by the invention is implemented;

Figure 2C:
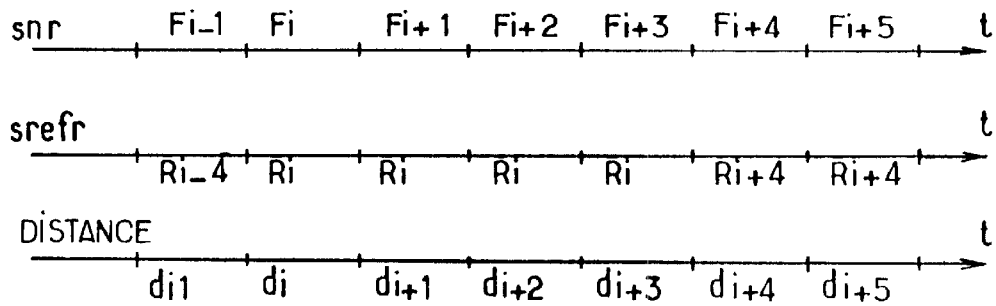
FIG. 2a shows a specific detail relating to implementation of the method proposed by the invention, whereby transmission quality is assessed in real time discretely or discontinuously.
FIG. 2b shows a specific detail relating to implementation of the method proposed by the invention, whereby transmission quality is assessed in real time in a substantially continuous manner.
Figure 2D:
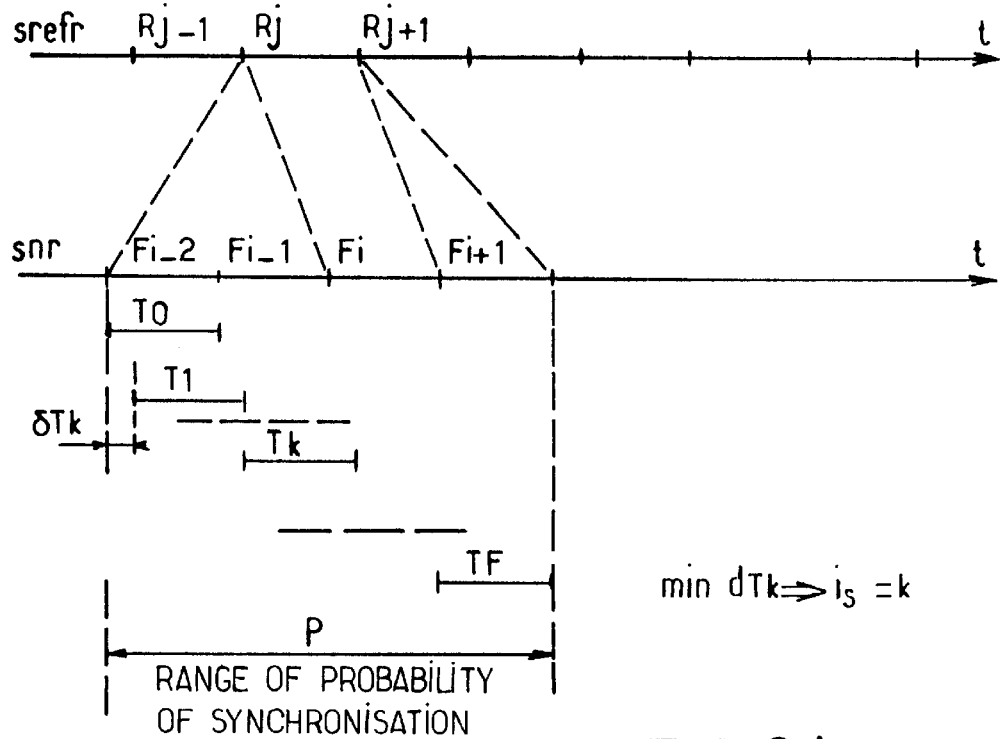
Figure 2E:
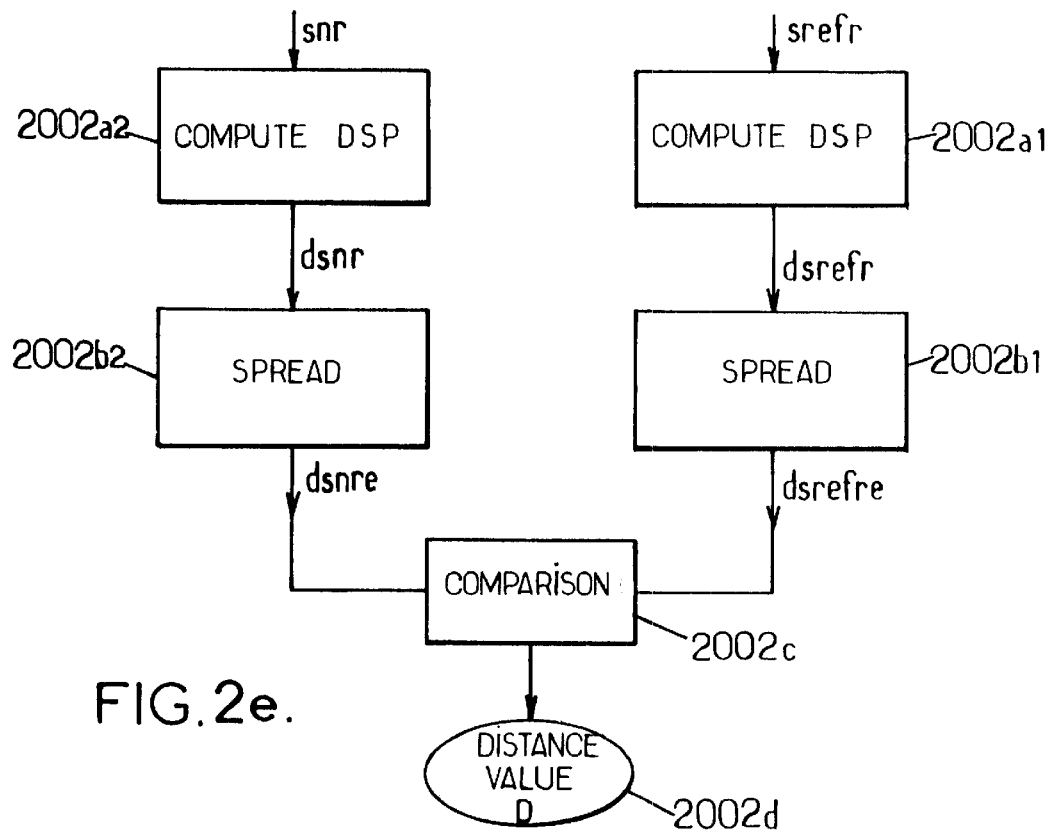
Figure 2F:
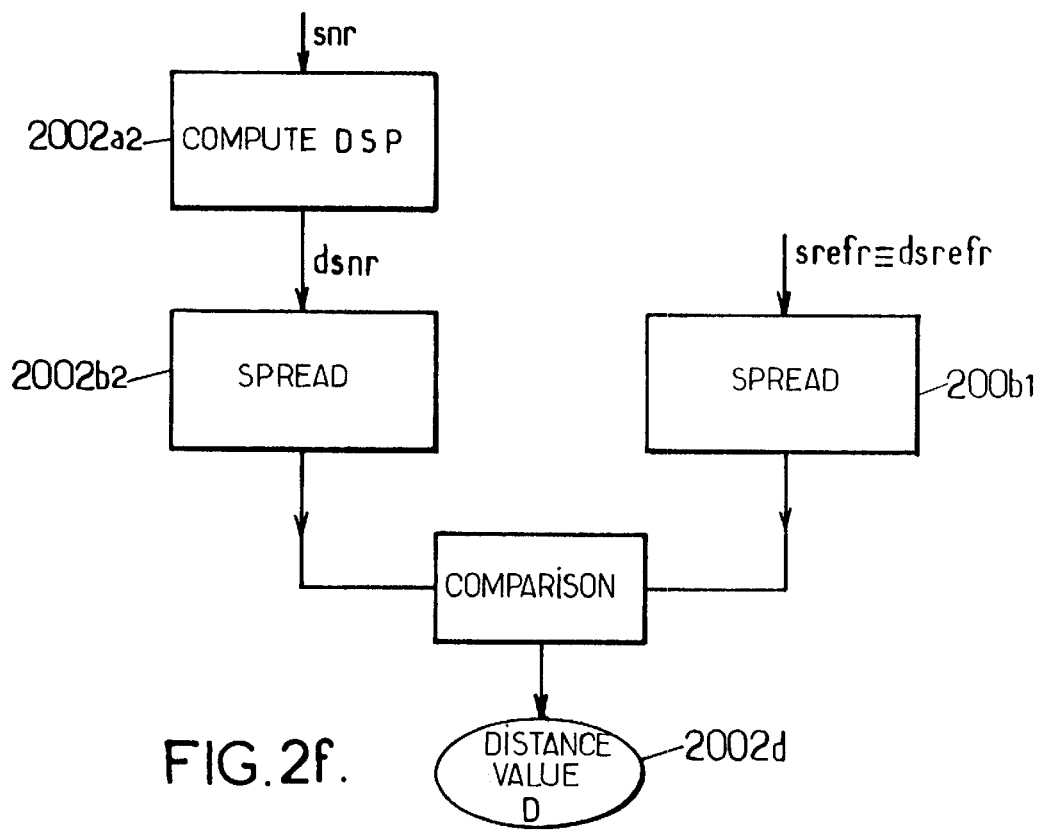
Figure 3A:
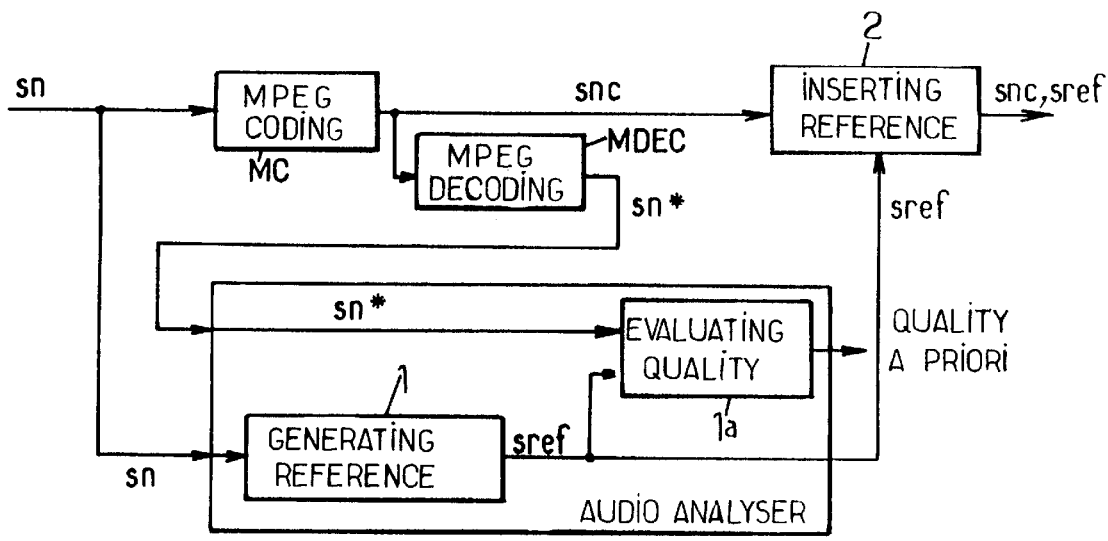
Figure 3B:
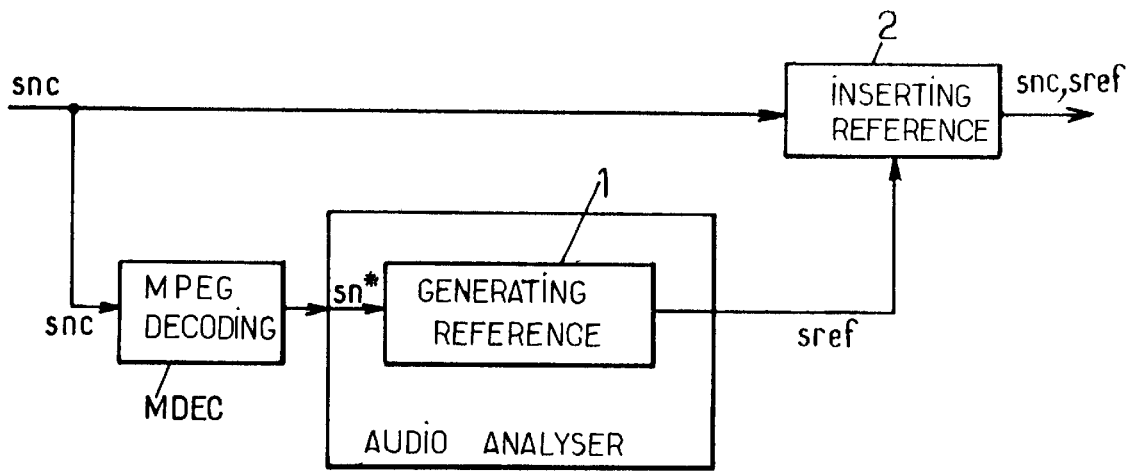
Figure 3C:
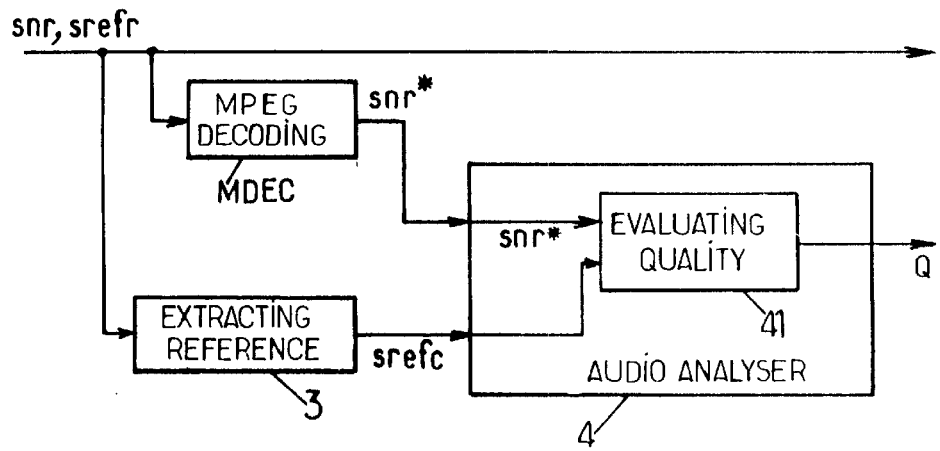
Figure 3D:
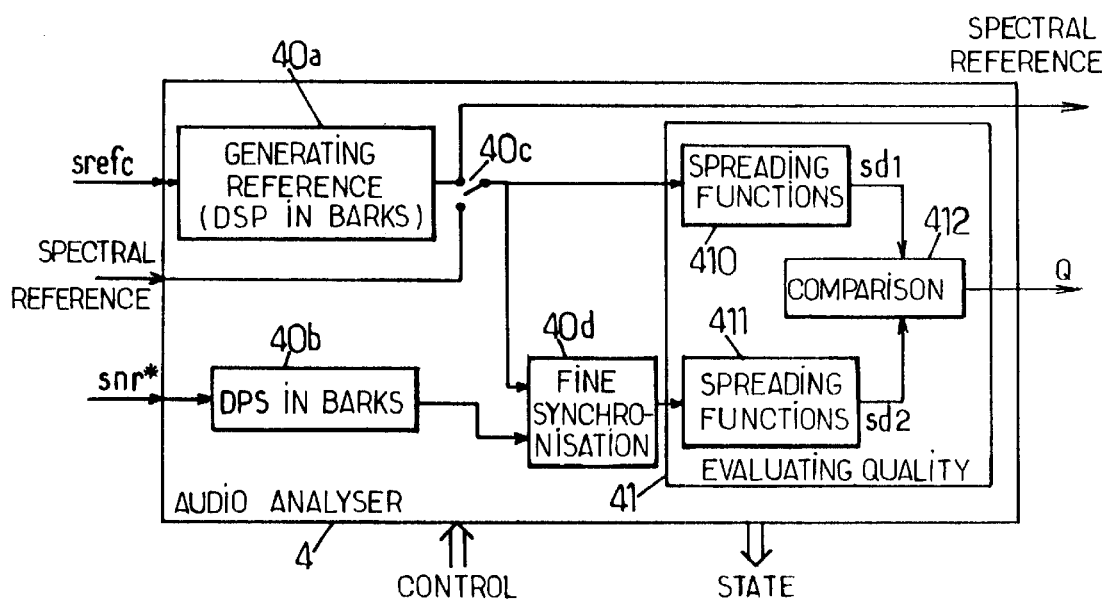

FIG. 2c provides an illustration of a specific example of a time ratio between a broadcast digital signal received, which is to be evaluated, and a broadcast reference signal received, enabling a distance calculation to be continuously computed between these two signals;

FIG. 2d illustrates a process whereby the broadcast reference signal received is finely synchronised with the broadcast digital signal received, enabling a time ratio to be established between these signals, as illustrated in FIG. 2c, for example;

FIG. 2e shows an operating mode, although this is not restrictive, in which the step, illustrated in FIG. 1, of computing the distance between the broadcast reference signal received and the broadcast digital signal received can be incorporated;

FIG. 2f shows a variant of the operating mode illustrated in FIG. 2e which is implemented if the reference signal is a power spectral density signal computed on transmission;

FIGS. 3a and 3b illustrate a device within a transmission network for broadcasting a digital signal, located at the transmission end, for evaluating on reception the broadcasting quality of this digital signal in a first embodiment and a second embodiment respectively;

FIG. 3c illustrates a device within a transmission network for broadcasting a digital signal, located at the receiving end, for evaluating on reception the broadcasting quality of this digital signal;

FIG. 3d shows an implementing detail taken from FIG. 3c.

A more detailed description of the method used to evaluate the quality of a digital signal on reception, as proposed by the invention, will now be given with reference to FIG. 1.

Generally speaking, the method proposed by the invention is suitable for applications involving any type of digital signal but more specifically digital audio/video signals such as television signals, which conventionally contain an audio component and which, for the purposes of this invention, will be regarded as being a digital audio signal. It may also be applied to the video element of digital video signals, under conditions which will be explained farther on in the description.

The method proposed by the invention is designed for implementation on any network broadcasting such a signal, this digital signal therefore being broadcast from an initial signal carrying transmitted data. The network in which this digital signal is transmitted or broadcast is therefore likely to be any Hertzian or satellite network enabling this digital signal to be broadcast from a transmission network head and enabling this digital signal to be received from at least one specific reception point. The features relating to transmission by Hertzian and/or satellite channel on this type of network are known from the prior art and will therefore not be described in detail.

Accordingly, at the level of the network transmission head, there is an initial signal, which may comprise a base band signal for the signal to be transmitted and a digital signal strictly speaking, which is digitized in the conventional manner so that it can be transmitted by broadcasting it by Hertzian or satellite channel.

As illustrated in FIG. 1 and as proposed by the method of the invention, there is at the network transmission head, at step 1000, not only an initial signal, shown by reference so, but a digital signal strictly speaking, denoted by sn.

In this same FIG. 1, the method proposed by the invention consists, on transmission, at a step 1001, in generating a reference signal, denoted by sref, which is representative of the initial signal. By signal representative of the initial signal is meant that the reference signal reproduces, at least partially, this initial signal or certain characteristics specific to it.

In particular, the reference signal can be obtained by sampling, as will be explained later on in the description, or from the actual initial signal, or from the digital signal mentioned above, the digital signal being itself representative of the initial signal by definition.

After the step at which a reference signal sref is generated, the method proposed by the invention then consists in broadcasting jointly, at step 1002, the digital signal sn and the reference signal sref.

For the purposes of the process of broadcasting the digital signal sn and the reference signal jointly, the latter may be inserted in the digital stream making up the digital signal to be broadcast, for example.

In a basic approach to implementing the method proposed by the invention, the reference signal may be made up of certain samples of the digital signal sn, these samples of the digital signal being taken over a given time segment or window of the digital signal and inserted at specific locations in the digital stream making up the digital signal to be broadcast.

Consequently, in a situation where the digital signal initially consists of a digital television signal, for example, the reference signal may be inserted in the MPEG flow, for example, using the payload auxiliary data bits provided for transmitting data, although this is not restrictive.

On emission, therefore, there is a composite signal consisting of a resultant digital stream, made up of the digital stream constituting the digital signal to be broadcast sn, in which the reference signal sref has been inserted.

Once all these signals have been transmitted by broadcasting, the method proposed by the invention also consists in, on receipt, at the level of the receiving point of the above-mentioned broadcasting network, receiving the digital signal and the reference signal broadcast as above.

As shown in FIG. 1, therefore, the broadcast digital signal received snr and the broadcast reference signal received, denoted by srefr, are available at the reception stage, at a step 2000.

Clearly, precisely because of the process of inserting the reference signal sref in the digital signal sn, the broadcast digital audio signal received snr and the broadcast reference signal received sref available at step 2000 mentioned above, will not be sufficiently accurately synchronised to enable the transmission quality of the above-mentioned digital signal to be evaluated immediately.

Consequently, as illustrated in FIG. 1, the method proposed by the invention incorporates a step 2001 at which the broadcast digital signal received snr is synchronised with the broadcast reference signal received srefr, after which, at a step 2002, a distance value is computed, this distance value being defined as the variance from identity separating the broadcast digital signal received snr from the broadcast reference signal received srefr. The distance value is denoted by D in FIG. 1.

Step 2002 at which the distance value D is computed is followed by a step 2003, at which a quality value Q based on a predetermined criterion is assigned on the basis of a criterion of the above-mentioned distance value D.

Specific examples of the steps involved in implementing the method proposed by the invention will now be described below.

Taking a situation in which the transmission quality of a digital signal is to be determined by a non-continuous evaluation process in real time, step 1001 at which a reference signal is created may consist, for example, in generating an arbitrary digital signal sequence. This arbitrary sequence may, by preference, form part of the initial signal. Under these conditions, step 2002 at which the distance value is computed, i.e. the variance from identity separating the broadcast digital signal received from the broadcast reference signal received, is then applied between this broadcast digital signal received and the arbitrary sequence. FIG. 2a illustrates an example of a situation in which the initial signal is sampled at a step 1001a enabling the arbitrary sequence, denoted by SA in the above-mentioned drawing, to be generated.

If need be, the arbitrary sequence SA may be a sequence known beforehand, which can be stored in memory before it is broadcast. In practice, sequences of this type, such as generic sequences used for advertisements or sequences of the type known as jingles are used several times a day in the programmes that are broadcast and can therefore be stored in advance. Under such conditions, the step at which the reference signal is transmitted can in effect be dispensed with, in which case the distance value computed at step 2002 can be determined from a recording or a memory storage containing this arbitrary sequence at the receiving end.

On the other hand, and in a second, preferred embodiment, in which the transmission quality of a digital signal transmitted during a broadcast is evaluated in real time, the step 1001 at which the reference signal is generated may, as illustrated in FIG. 2b, consist in sampling the initial signal or, preferably, the digital signal sn at a step 1001a' across given successive windows or segments of an arbitrary duration, each window being denoted by $F_i$ in FIG. 2b. The successive windows are denoted by $F_{i-1}$, $F_i$, $F_{i+1}$ in FIG. 2b.

Step 1001a' at which the initial signal or digital signal sn is sampled is then followed by a step 1001b' at which one of M windows is chosen, M being a given whole number, which will constitute the reference signal sref.

In the example illustrated in FIG. 2b, the selected windows are shown by hashed sections in an implementing mode in which one window in M=4 successive windows, $F_{i-M}$, $F_i$, $F_{i+M}$, is stored in succession in memory and will therefore constitute the reference signal sref. The above-mentioned time segments or windows are then broadcast jointly with the digital signal sn to form the reference signal broadcast jointly with this digital signal. Accordingly, by way of example although this is not restrictive, each window $F_{i-M}$, $F_i$, $F_{i+M}$ is inserted in the digital stream of the digital signal sn. If the signal is a television signal, for example, each window will be inserted in the MPEG flow using payload auxiliary data bits provided for transmitting these data.

As far as the duration of the said time windows or segments is concerned, this duration may be arbitrary and is taken as being equal to $\tau_i$=40 ms, for example.

A description will now be given with reference to FIG. 2c of step 2002 at which the distance value D separating the broadcast digital signal received snr from the broadcast reference signal received srefr is computed, in the situation where a computing process is applied to a broadcast digital signal received snr synchronised with a broadcast reference signal received srefr. A detailed description of the process used to synchronise these signals will be given later on in the description with reference to FIG. 2d.

Turning to FIG. 2c, it will be assumed that the broadcast digital signal received snr and the broadcast reference signal received srefr are synchronised and we therefore have, as illustrated in FIG. 2c, on the one hand the sequence of successive windows $F_{i-M}$, $F_i$, $F_{i+M}$ . . . making up the broadcast digital signal received snr as well as the broadcast reference signal received srefr.

In the situation illustrated in FIG. 2c, where the reference signal is one of the M windows of the digital signal, M being 4 in the example illustrated in FIG. 2c, there are M identical consecutive reference values, denoted $R_{i-4}$, $R_i$, $F_{i+4}$, corresponding to the window of the broadcast digital signal received bearing the same index i-4, i, i+4.

Consequently, for the windows of the broadcast digital signal received snr and written as $F_i$, $F_{i+1}$, $F_{i+2}$ $F_{i+3}$, the reference value $R_i$ is the corresponding window $F_i$ validated for the four windows $F_i$ to $F_{i+3}$ mentioned above. The same applies to the preceding and subsequent windows and the corresponding reference values.

Looking at FIG. 2c, step 2002 at which the distance value D is computed would then involve computing the elementary distance D separating time segments of the broadcast digital signal received from corresponding time segments of the broadcast reference signal received. These elementary distances are written as $d_i$ in FIG. 2c, each elementary distance computed bearing the same index as the corresponding window $F_i$ of the broadcast digital signal received snr.

Finally, an average time of the elementary distances $d_i$ of all the time segments is calculated in order to obtain the actual value of distance D. For N successive segments such as the segments $F_{i-1}$, to $F_{i-5}$ for example, as illustrated in FIG. 2c, the actual distance between the two signals will then be given by:

$$D = \frac{1}{N} \sum_{i=0}^{N-1} d_i$$

Accordingly, by implementing the method proposed by the invention, there is no need to define a set of test signals, such as sinusoids, ramps or pulses, beforehand. Any digital signal, whether it be a video signal, a speech or music signal, can then be used when taking objective perceptual measurements, for example, once the reference signal has been finely synchronised with the digital signal to be evaluated.

More specifically in the case of the implementing method proposed by the invention and illustrated in FIGS. 2b and 2c, in which certain successive time segments are broadcast jointly and periodically on the basis of one time segment out of M successive time segments of the digital signal in order to form the reference signal, the distance value D between the broadcast digital signal received snr and the broadcast reference signal received verifies the equation:

$$D = \frac{1}{N/M} \sum_{i=0}^{N/M-1} d_i$$

In this equation:

N denotes the number of successive time segments across which the average is calculated, M denotes a whole number greater than 1, the reference signal being made up of one of N time segments or windows of the digital signal sn.

Under these conditions, the evaluated distance value D remains reliable provided the ratio N/M is sufficiently high. Accordingly, if M=4, N may be a value greater than 40.

A more detailed description will now be given with reference to FIG. 2d of how the broadcast digital signal received snr is finely synchronised with the broadcast reference signal received srefr at step 2001 in FIG. 1 in order to obtain the synchronised signals illustrated in FIG. 2c, for example.

As illustrated in the above-mentioned drawing, the method proposed by the invention as a means of finely synchronising the above-mentioned signals consists in defining on the broadcast digital signal received snr a range P of likelihood of this signal being synchronised with the reference signal srefr, in particular a value or window, time segment, of a given reference $R_j$. The index j denotes any value of this index corresponding to one of the index values i-4, i or i30 4 in FIG. 2c, for example.

In effect, for the time segment bearing reference $R_j$, there is within the broadcast digital signal received snr a range, bounded as a whole by successive time intervals or segments $F_i$, for which one of the time segments or windows $F_i$ of the broadcast digital signal received snr exhibits a maximum likelihood of being identical with the time segment bearing reference $R_j$. As an illustrative but not restrictive example, FIG. 2d shows four time windows $F_{i-2}$, $F_{i-1}$, $F_1$, $F_{i+1}$ which make up the range P. It is clear that the number of successive windows $F_i$ making up the above-mentioned range P may be multiplied, in which case a higher number of successive windows making up the above-mentioned range P will require nothing more than a higher computing capacity. The number of successive windows may be between 50 and 100, for example.

From the range P of synchronisation likelihood described above and illustrated in FIG. 2d, the method proposed by the invention then consists in sub-dividing the broadcast digital signal received snr during each time range of likelihood into successive time segments, written $T_0$, $T_1$, . . . $T_k$, . . . $T_F$, as illustrated in FIG. 2d. These successive time segments are shifted by a maximum time value, written $\delta T_K$, the value of which corresponds to the maximum admissible uncertainty of effective synchronisation between the broadcast digital signal received snr and the broadcast reference signal received srefr. Accordingly, across the range P of synchronisation likelihood, the time segments $T_K$ constitute a sliding window allowing it to be explored.

In accordance with the method proposed by the invention and in order to ensure that the fine synchronisation process illustrated in FIG. 2d is applied, the method then consists in computing a distance between each shifted successive time segment $T_K$ of the received digital signal snr and the reference window $R_j$. The corresponding distances are written as $dT_K$ for each time segment $T_K$ of the range P of synchronisation likelihood mentioned above. The set of values denoting distance between each shifted successive time segment and the reference signal $R_j$ is then applied to a filter process in order to determine the minimum distance value across said set. This minimum value is written min $dT_K$.

The rank of the time segment of the received broadcast digital signal for which the computed distance from the reference signal is minimum is then taken as the synchronisation value on the basis of the equation:

$$\min dT_K ==> i_s = k$$

where $i_s$ represents the synchronisation rank of the window $F_i$ of the broadcast digital signal received snr.

For the purposes of computing the distance, being the variance from identity separating the broadcast digital signal received snr from the broadcast reference signal received sref, used both to assign the quality value criterion on reception of the digital signal and to perform the synchronisation process described above, the distance value may, in the case of a digital audio signal, consist of the perceptual distance between each successive time segment and the reference signal or, as is the case and more generally for any type of digital or video digital signal, of the unit value variance in the inter-correlation function between each successive time segment, such as the segments $T_K$, and the reference value $R_j$ in the case of the synchronisation process or if computing the distance at step 2002 of FIG. 1.

For the purposes of computing the inter-correlation function in the example illustrated in FIG. 2c, the method used to calculate this inter-correlation function is totally conventional and the reference signal, is, for example, a reference window $R_j$ and the relevant time segment $T_K$ when applying the synchronisation process or, respectively, any time segment or window $F_i$ and the synchronised reference time value or segment $R_{i_s}$. In effect, both the window $F_i$ of the broadcast digital signal received snr and the broadcast reference signal received sref in its reference window $R_i$ are made up of a same number of samples and the inter-correlation function therefore corresponds to a perfectly conventional definition. The same applies to the time segments $T_K$ and the reference time segment or time window $R_j$ used to apply the synchronisation process illustrated in FIG. 2d.

In addition to computing an inter-correlation function as outlined above and more specifically in the case where the calculated distance is the perceptual distance for a digital audio signal for example, the actual process used to compute the distance value D will now be described in more detail in conjunction with FIG. 2e.

In this drawing, the computing process consists in computing, at least for one time segment of the broadcast reference signal received srefr and one time segment of the broadcast digital audio signal received snr, the power spectral density of the broadcast reference signal received srefr at a step 2002$a_1$ and the power spectral density of the broadcast digital signal received snr in a step 2002$a_2$ in order to generate a power spectral density signal from the broadcast reference signal received and a power spectral density signal from the broadcast digital audio signal received, these being denoted by dsrefr and dsnr respectively.

In the situation where the specific signal to be evaluated is a digital audio signal, it is of advantage to calculate the power spectral density of both the broadcast digital audio signal received snr and the broadcast reference signal received srefr in barks.

Following on from steps 2002$a_1$ and 2002$a_2$, the method proposed by the invention consists in applying to each power spectral density signal dsrefr and dsnr a process to spread the frequency spectrum in order to generate respectively a power spectral density signal from the broadcast reference signal received and spread and a power spectral density signal from the broadcast digital audio signal received and spread, these signals being denoted respectively by dsrefre and dsnre.

At step 2002c, a comparison is made between the power spectral density signal of the broadcast reference signal received and spread dsrefre and the power spectral density signal of the broadcast digital audio signal received and spread dsnre in order to generate the distance value D obtained at step 2002d illustrated in FIG. 2e.

It should be pointed out that computing the power spectral density of said two signals in barks is justifiable when using a digital audio signal for evaluation purposes on the principle of objective perceptual measurements. These measurements are based on the transformation of the physical representation, acoustic pressure, level, time and frequency of the digital audio signal into the acoustic representation, sound force, masking level, time and critical band or barks of said two signals, i.e. the reference signal and the digital audio signal to be evaluated, as a basis for comparing them. This transformation is performed by modelling the human hearing system and the modelling process consists in conducting a spectral analysis in the barks domain followed by a frequency spreading process specific to auditive perception.

The distance between the psycho-acoustic representations of the two signals can then be computed. This distance may then be correlated to the quality of the signal to be evaluated. The smaller the distance and the closer the signal to be evaluated is to the initial signal, the better the broadcasting quality of the latter will be.

In order to break down a digital audio signal into time segments of 40 ms as described, sampled at a sampling frequency Fe=48 kHz with a resolution of 16 bits, this segment is represented by 32 kbits of data. The spectral representation of this time segment in the barks domain, on the other hand, may be represented by 768 bits, i.e. about 42 times less. In effect, for a spectral resolution of 1 bark and an analysis covering a band of 1 to 24 barks over a frequency from 0 to 15 500 Hz, the spectral representation of the segments consists of 24 points of 32 bits each for the purposes of floating point coding. Consequently, by using the processing outlined above, it is possible to calculate the power spectral density on the reference signal in the barks domain before it is transmitted and broadcast so as to transmit this spectral representation rather than a time representation of it. This being the case, the binary flow rate necessary to transmit the reference signal will be largely reduced and can be evaluated at twice 18 kbits/s for a stereophonic signal sampled at the above-mentioned sampling frequency.

The method proposed by the invention therefore enables the reference signal to be transmitted at a very low rate. This transmission may be either across a telecommunications network or direct with a view to broadcasting a digital television signal, for example, or a digital radio emission of the digital radio broadcasting type known as DAB, Digital Audio Broadcasting. In this case, the elementary distance of the value for the inter-correlation function is computed between time segments after a frequency transform has been applied to the broadcast reference signal and the broadcast digital audio signal and after the power spectral density of these signals has been calculated. It is of advantage if this operation is performed, at least as regards the reference signal, on emission so as to reduce the data which need to be transmitted to form the reference signal. This will in turn simplify the process by which the distance D is computed on reception, as illustrated in FIG. 2f, insofar as it is no longer necessary to compute the power spectral density of the broadcast reference signal received, srefr, which means that step $200a_1$ in FIG. 2e can be omitted.

Turning now to FIGS. 3a to 3d, a more detailed description will now be given of a system proposed by the invention as a means of evaluating the quality of a broadcast digital signal on reception and enabling the process described earlier to be implemented.

Generally speaking, the system proposed by the invention for evaluating the quality of a broadcast digital signal on reception is integrated in a transmission network through which this signal is broadcast. Clearly, in order to retain clarity in the drawing, none of the elements belonging to the transmission network itself are shown in FIGS. 3a to 3c.

However, the system proposed by the invention consists of a module for generating the reference signal, located at the emission end upstream of the emission device, as shown by reference 1 in FIGS. 3a and 3b. As may be seen from reference A in FIG. 3a in particular, the emission head of the network is conventional, comprising, particularly if the broadcast digital signal is a signal of the digital television type sn although this is not restrictive, a coding module of the MPEG type, this module being shown by reference MC, which issues a coded digital audio signal denoted by snc.

As may be seen from FIG. 3a, the system proposed by the invention for evaluating the quality of the broadcast digital audio signal sn on reception also has a module 1, being the generator of the reference signal mentioned above, which generates a reference signal from the initial signal, the initial signal being the digital audio signal sn mentioned earlier in the description.

As illustrated in the same FIG. 1, the system for evaluating on reception comprises, at the emission end, a module 2 for inserting the reference signal sref issued by module 1, which generates the reference signal, in the digital stream of the coded digital audio signal snc issued by the MPEG coding module shown by reference MC in FIG. 3a. The module 2 which inserts the reference signal sref in the digital stream of the coded digital audio signal snc enables a binary flow to be generated which can then be broadcast by conventional emission means, which are not shown in FIG. 3a.

As illustrated in the same FIG. 3a, the system proposed by the invention for evaluating the quality of the broadcast digital audio signal on reception, which generates the reference signal, may also have a module for decoding the coded digital audio signal snc, this decoding module being denoted by MDEC and providing decoding of the MPEG type for a digital television signal that has been encoded using the MPEG coding protocol. The decoding module MDEC issues a reconstituted digital audio signal, denoted by sn*.

As illustrated in FIG. 3a, the system proposed by the invention for evaluating the quality of the broadcast digital audio signal on reception, may advantageously have a module, shown by 1a, for evaluating the quality of the coded emission signal a priori, in which case this evaluation module 1a will receive the reconstituted digital audio signal sn* and the reference signal sref a priori in order to issue a signal representative of the quality of the coded emission signal, this signal clearly being representative of the quality of said coded emission signal a priori. The module 1 which generates the reference signal and the module $1_a$ which evaluates the quality a priori in effect constitute an audio analyser.

FIG. 3b illustrates a different embodiment of the reference signal generator module shown in FIG. 3a, more specifically for the situation in which this module is operated immediately downstream of the MPEG coding module MC for a digital television signal. In this case, the entire unit may be simplified as compared with the embodiment illustrated in FIG. 3a since the device illustrated in FIG. 3b operates on the basis of the coded digital audio signal snc mentioned above with reference to FIG. 3a. In addition, the module for evaluating the quality of the coded emission signal a priori may be omitted to simplify the system. Under these conditions, the embodiment illustrated in FIG. 3b will include the MPEG decoding module MDEC mentioned in connection with FIG. 3a, this module issuing the reconstituted digital audio signal sn* in substantially the same manner as illustrated in FIG. 3a. This signal is used by the module 1 in the audio analyser generating the reference signal to generate the reference signal sref which is applied to the module 2 used to insert the reference signal, which, as above, issues the coded digital audio signal snc with the reference signal sref inserted therein in order to set up the binary flow to be broadcast, as described in relation to FIG. 3a.

For the purposes of implementing the devices proposed by the invention and illustrated in FIGS. 3a and 3b, on the one hand the coded digital audio signal snc and the reference signal sref are essentially or at least largely synchronised and this synchronisation is generally retained when the reference signal is inserted in the binary stream of the coded digital audio signal snc and transmitted to a sufficiently accurate degree to allow the range P of probability of synchronisation described above to be defined in accordance with the method proposed by the invention.

Finally, the system proposed by the invention for evaluating the quality of the broadcast digital audio signal on reception, has, as illustrated in FIG. 3c, on a level with the reception point of the transmission network and downstream of the reception device of this network transmitting the broadcast digital audio signal, a module for evaluating quality on reception.

More specifically, the receiving device issues a digital stream made up of a coded digital audio signal received, denoted by snr in FIG. 3c, and a reference signal received, denoted by srefr.

The system proposed by the invention for evaluating the quality of the broadcast digital audio signal therefore has at least one module constituting said quality evaluation module and an auxiliary module for decoding the coded digital audio signal received, this auxiliary decoding module being denoted by MDEC and issuing a decoded-coded digital audio signal received, denoted by snr*.

Clearly, if the broadcast digital audio signal is a coded digital television signal of the MPEG type, the decoding module MDEC is a MPEG decoding module which issues the decoded-coded digital audio signal received, denoted by snr*.

The quality evaluation module illustrated in FIG. 3c also has a module, shown by reference 3, for extracting the reference signal received, receiving said digital stream snr, srefr and issuing a control reference signal, denoted by srefc. In addition, a module 4 for evaluating the transmission quality of the broadcast digital audio signal receives the decoded-coded digital audio signal received snr* and the control reference signal srefc and issues, on the basis of an identity criterion separating the decoded-coded digital audio signal from the control reference signal, a signal representative of a quality value on reception of the digital audio signal a posteriori. This signal is denoted by Q in FIG. 3c. The module 4 which evaluates said transmission quality of the broadcast digital audio signal is in fact an audio analyser if the coded digital signal to be evaluated is a digital audio signal.

A more detailed description of said digital audio analyser 4 will now be given with reference to FIG. 3d in a situation where the digital signal transmitted is a broadcast digital audio signal. In this case, as illustrated in FIG. 3d, the module 4 has a module for computing the power spectral density of the control reference signal, which issues a signal representative of the power spectral density of the control reference signal, this module being shown by reference 40. If the digital signal transmitted by broadcasting is a digital audio signal, the computing module 40a is a module specifically for calculating the power spectral density in barks, as mentioned earlier on in this description of the method proposed by the invention.

Similarly, the module 4 has a module 40b for computing the power spectral density of the decoded-coded digital signal received snr* which issues a signal representative of the power spectral density of the decoded-coded digital signal received snr*. Similarly, if the decoded-coded digital signal is a digital signal snr, the computing module 40b will be capable of computing the power spectral density in barks. The modules 40a and 40b are also followed by a module 41 for evaluating the quality of the digital signal, this module 41 having, as illustrated in FIG. 3d, a first spectrum spreading module 410 which receives the signal representative of the power spectral density of the reference signal via a switch 40c, this spreading module 410 issuing a first computed distance signal, denoted by $sd_1$. A second spectrum spreading module 411 is provided, which receives the representative signal of the power spectral density of the decoded-coded digital signal received and issues a second computed distance signal $sd_2$.

Clearly, a fine synchronisation module 40d is interconnected between the second spectrum spreading module 411 and the output of the computing module 40a via the switching element 40c and the output of the module 40b which computes the power spectral density of the digital signal. The fine synchronisation module switches the switch 40c to an appropriate position, applying thereto the signal representative of the power spectral density of the reference signal, a synchronisation of said two signals, i.e. signal representative of the power spectral density of the reference signal and the signal representative of the power spectral density of the digital signal, in a manner similar to that described with reference to FIG. 2d as part of the method proposed by the invention. A decoded-coded digital signal received and synchronised is applied to the second spectrum spreading module 411.

Finally, the module 41 has a distance-computing module 412 which receives the first and second computed distance signal $sd_1$, $sd_2$ and issues the signal representative of a quality value on reception, this being the quality of the digital signal a posteriori.

What is claimed is:

1. A method of evaluating on reception the quality of a broadcast digital signal emitted from an initial signal, wherein said method comprises the steps of:

(a) on emission,
   generating a reference signal representative of said initial signal; and
   broadcasting said digital signal and said reference signal jointly; and (b) on reception,
   synchronizing said broadcast digital signal received and said broadcast reference signal received;
   computing a distance value, as the variance from identity, separating said broadcast digital signal received from said broadcast reference signal received; and
   assigning, on the basis of a value criterion of said distance value, a quality value of said digital signal on reception.

2. The method according to claim 1, wherein in order to perform a non-continuous evaluation in real time of the quality of a broadcast digital signal being emitted, the step at which said reference signal is generated consists in generating an arbitrary digital signal sequence, said arbitrary digital signal sequence also forming part of said initial signal, said step of computing a distance value, as the variance from identity separating the broadcast digital signal received from said broadcast reference signal received, being applied between said broadcast digital signal received and said arbitrary sequence.

3. The method according to claim 1, wherein in order to perform an evaluation in real time of the quality of a broadcast digital signal being emitted, the step at which said reference signal is generated comprises:
   sampling said initial signal by discrete successive time segments; and
   broadcasting certain successive time segments jointly with said digital signal to form said reference signal.

4. The method according to claim 1, wherein said step of computing the distance value comprises:
   computing the elementary distance separating the time segments of the broadcast digital signal received from corresponding time segments of the broadcast reference signal received; and
   computing the average time of the elementary distances of all the time segments.

5. The method according to claim 4, wherein in order to periodically broadcast certain successive time segments jointly on the basis of one in M successive time segments to form said reference signal, said distance value between said broadcast digital signal received and said reference signal verifies the equation:

$$D = \frac{1}{N/M} \sum_{i=0}^{N/M-1} d_i$$

in which equation:
   N denotes the number of successive time segments
   M denotes a whole number greater than 1.

6. The method according to claim 1, wherein in order to evaluate the quality of a broadcast digital signal in real time, said step of synchronising said broadcast digital signal received with said broadcast reference signal received comprises from a given time range of synchronisation likelihood of said broadcast digital signal received with said broadcast reference signal received:
   sub-dividing said broadcast digital signal received during each time range into successive time segments shifted by a maximum time value corresponding to the effective maximum admissible uncertainty of synchronization between said broadcast digital signal received and said reference signal;

computing a distance between each shifted successive time segment of said broadcast digital signal received and said reference signal; and retaining as the synchronization value the rank of the time segment of said broadcast digital signal received for which the distance computed with said reference signal is minimal.

7. The method according to claim 6, wherein said distance is the variance to the unit value of the inter-correlation function, or the perceptual distance in the case of a digital audio signal, between each shifted successive time segment and said reference signal.

8. The method according to claim 7, wherein for a reference signal made up of certain successive time segments of said initial signal, of a given time value, said shifted successive time segments have a time value equal to said given time value, the value of said inter-correlation function being computed between each shifted successive time segment of the broadcast digital signal received and each of said certain successive time segments of said initial signal constituting the reference signal.

9. The method according to claim 1, wherein said distance computing step comprises, for at least one time segment of said broadcast digital signal received:

computing the power spectral density of said broadcast reference signal received in order to generate a power spectral density signal from said broadcast reference signal received and respectively from said broadcast digital signal received;

applying a frequency spreading process to each power spectral density signal in order to generate a spread power spectral density signal from said reference signal and respectively a spread power spectral density signal from said broadcast digital signal received; and comparing the spread power spectral density signal of said broadcast reference signal received and the spread power spectral density signal of said broadcast digital signal received to generate a distance value.

10. The method according to claim 2, wherein for a digital signal formed by a digital audio signal, said step of generating said reference signal comprises in:

sampling said initial signal by successive discrete time segments;

computing the power spectral density for each sampled successive discrete time segment in order to generate a power spectral density signal for each sampled segment; and broadcasting said power spectral density signal of each sampled time segment jointly with the digital audio signal in order to form said reference signal, thereby allowing the digital rate needed to transmit said reference signal to be reduced.

11. The method according to claim 1, wherein said distance computing step comprises, for at least one time segment of said broadcast reference signal received which is performed by said power spectral density signal of each sampled segment:

computing the power spectral density of said broadcast digital audio signal received in order to generate a power spectral density signal from said broadcast digital audio signal received;

applying a frequency spreading process to said broadcast reference signal received formed by said power spectral density signal of each sampled time segment, and to the power spectral density signal of said broadcast digital audio signal received in order to generate a spread power spectral density signal from said reference signal and a spread power spectral density signal from said broadcast digital audio signal received respectively; and comparing the spread power spectral density signal of said broadcast reference signal received and the spread power spectral density signal of said broadcast digital audio signal received in order to generate a distance value.

12. In a transmission network for broadcasting a broadcast digital audio signal emitted from an initial signal, said transmission network including, upstream of a device for emitting a broadcast digital audio signal, means for coding said initial signal to produce a coded digital signal, a system for evaluating the quality of said broadcast digital audio signal on reception, comprising at least, upstream:

means for generating a reference signal representing said initial signal and means for receiving said coded digital audio signal and said reference signal, and means for inserting said reference signal in the digital stream of said coded digital signal in order to create a coded emission signal allowing said broadcast digital audio signal to be generated.

13. A system for evaluating according to claim 12, further comprising:

means for decoding said coded digital signal and issuing a reconstituted digital signal; and evaluating means for carrying out a first evaluation of the quality of said coded emission signal, said evaluating means receiving said reconstituted digital signal and said reference signal and issuing a signal representative of the quality of said coded emission signal.

14. In a transmission network for broadcasting a broadcast digital audio signal emitted from an initial signal, said broadcast digital signal being formed from a coded digital signal in which a reference signal representative of said initial signal is inserted, said transmission network including a device for receiving said broadcast digital signal which issues a digital stream formed by a coded digital signal received and a reference signal received, a system for evaluating the quality of said broadcast digital signal on reception comprising, downstream of said device for receiving:

auxiliary means for decoding said coded digital signal received which receives said coded digital signal received and issues a decoded-coded digital signal;

means for extracting said broadcast reference signal received which receives said digital stream and issues a control reference signal; and means for evaluating the transmission quality of said broadcast digital signal which receives said decoded-coded digital signal and said control reference signal and for delivering by applying the distance value criterion, as the variance from identity separating said decoded-coded digital signal from said control reference signal, a signal representative of a quality value on reception a posteriori of said digital signal.

15. The system for evaluating according to claim 14, wherein said means for evaluating the transmission quality of said broadcast digital signal comprise:

means for computing the power spectral density of said control reference signal and issuing a signal representative of the power spectral density of said control reference signal;

first spectrum spreading means receiving said signal representative of the power spectral density of said control reference signal and issuing a first distance computation signal;

means for computing the power spectral density of said decoded-coded digital signal and issuing signal representative of the power spectral density of said decoded-coded digital signal;

second spectrum spreading means receiving said signal representative of the power spectral density of said decoded-coded digital signal and issuing a second distance computation signal; and distance computing means receiving said first and second distance computation signal and issuing said signal representative of a quality value on reception a posteriori of said digital audio signal.

16. An in-service, real-time picture quality analysis method of measuring degradation of a test digital signal at a test point with respect to a reference signal, said method comprising the steps of:

generating from the reference signal a set of parameters that characterize the reference signal;

inserting the set of parameters into a transport stream containing an encoded version of the reference signal for transmission to the test point;

extracting at the test point the set of parameters from the transport stream;

generating at the test point from the test signal a corresponding set of parameters, the test signal being a decoded version of the reference signal derived from the transport stream;

synchronizing at the test point the set of parameters representing the reference signal and the set of parameters representing the test signal; and comparing the two sets of parameters to produce a picture quality rating that represents the degradation of the test signal with respect to the reference signal.

* * * * *